Patented July 29, 1941

2,250,662

UNITED STATES PATENT OFFICE 2,250,662

MOLDING POWDER OF UREA-FORMALDEHYDE RESIN CONTAINING A CURING ACCELERATOR

James Martyn Walter, Norton-on-Tees, England, assignor to Imperial Chemical Industries Limited, a corporation of Great Britain No Drawing. Application November 14, 1938, Serial No. 240,380. In Great Britain November 19, 1937

9 Claims. (Cl. 260—69)

This invention relates to molding powders of urea-formaldehyde resin and more particularly to accelerators therefor. Such molding powders consist essentially of a dry mixture of a condensation product of urea and formaldehyde and usually a filler, which product is transformable by the action of heat and pressure into an infusible mass. To accelerate the latter process, which is known as curing, it has been proposed to add various substances, notably substances whose acidity is developed or increased on heating in the molding operation, e. g. organic acids containing halogen which liberate hydrogen halide on heating.

This invention has as an object to devise a new method of accelerating the curing of such resins. A further object is to devise such a method which will give a resin having an improved surface finish. A still further object is to provide an accelerator for such resins which will also improve the storage properties of the molding powders made from such resins. A still further object is to provide new molding powders of the urea-formaldehyde resin. A still further object is to devise a method of manufacturing new molding powders of the urea-formaldehyde resin. Further objects will appear hereinafter. These objects are accomplished by the following invention.

I have now found that the tri-esters of phosphoric acid are excellent accelerators for the curing of urea-formaldehyde resins and that their use leads to certain unexpected advantages. (By the term tri-ester I means an ester in which all the replaceable hydrogen atoms of the acid are replaced by equivalent radicals.)

According to the invention therefore I accelerate the curing of urea-formaldehyde resins by incorporating in the resin when in powder form in its uncured state a quantity of a tri-ester of phosphoric acid having a PO4 content amounting to between 0.1% and 2.0% of the dry resin present.

The invention is illustrated but not limited by the following examples.

Example 1

A urea-formaldehyde resin syrup having 1 molecule of urea to 1.5 molecules of formaldehyde was incorporated in known manner with paper pulp in the ratio of 306 parts by weight of syrup to 174 parts of pulp. The syrup-impregnated pulp is then dried in a rotary drier to 1–2% free moisture content and ground in a ball mill with 0.2% zinc stearate, 0.1% of cyclohexanol stearate and 1.0% of triethyl phosphate. The resultant product is a white, free-flowing powder which can be stored at ordinary temperatures for over six months without deterioration.

Example 2

Syrup-impregnated filler prepared and dried as in Example 1, is ground in a ball mill with 0.2% zinc stearate and 0.2% of cyclohexanol stearate, together with 0.1% of the pigment known as monastral blue and 0.75% of dimethylethyl phosphate. The product is a blue, free-flowing powder of similar storage properties to the product of Example 1.

Example 3

Syrup-impregnated filler prepared and dried as in Example 1, is ground in a ball mill with 0.2% zinc stearate and 0.1% of cyclohexanol stearate, together with 0.1% of the pigment known as cadmium yellow and 1.3% of tricresyl phosphate. The product is a yellow, free-flowing powder with storage properties similar to those of the products of Examples 1 and 2.

The amount of ester to be added is dependent upon the rate of curing desired, but usually quantities giving a PO4 content of the order of 0.1% to 1% calculated on the weight of dry resin present are most satisfactory. The accelerator is preferably intimately mixed with the ground condensation products, e. g. in a ball mill.

Beside the esters mentioned in the above examples I could use any other organic tri-ester of phosphoric acid including mixed esters derived from two or more alcohols. Further examples of such esters are tri-butyl phosphate, tri-phenyl phosphate, di-phenyl cresyl phosphate, glyceryl phosphate, tri-allyl phosphate, tri-isobutyl phosphate, tri-isopropyl phosphate, ethyl diphenyl phosphate, di-ethyl phenyl phosphate, tri-benzyl phosphate, tri-carvacryl phosphate

[(CH3)2.CH.C6H3(CH3).O]3PO 

tri-phenyl phosphate, tris-amyl phenyl phosphate [Tri(4 tertiary amylphenyl)phosphate], tri-santalyl phosphate (C15H23O)3PO, dimethyl phenyl phosphate, tri-thymyl phosphate and methyl dibenzyl phosphate.

The usual stabilisers may, if desired, be incorporated in the molding powders, the storage properties of the latter being thereby improved. Suitable stabilisers are ammonium carbonate, ammonium carbamate and aldehyde-ammonia. For example, the addition of 1% of ammonium carbonate to the composition of Example 1 enables it to be safely stored for periods of over six months at temperatures up to 35° C.

This invention is a valuable advance in the art as it discloses a method whereby an accelerator can be incorporated into a molding powder which will be highly effective at molding temperatures but will not make the powder unstable at storage temperatures, thereby making the use of stabilisers unnecessary except where exceptionally long storage periods are contemplated, and effecting economy and a simplification in manufacture.

As many apparently widely different embodiments of this invention may be made without departing from the spirit and scope thereof, it is to be understood that the invention is not limited to the specific embodiments thereof except as defined in the appended claims.

I claim:

1. In the process of preparing a molding powder which can be molded by heat and pressure, the step of intimately mixing an uncured dry urea-formaldehyde resin when in powder form with a curing accelerator consisting of tri-ethyl phosphate in an amount such that the $PO_4$ content is approximately 0.1 per cent to 2.0 per cent of said dry resin, said curing accelerator remaining ineffective at storage temperatures but being capable under the action of molding heat and pressure of accelerating the curing of the molding powder into an infusible mass.

2. In the process of preparing a molding powder which can be molded by heat and pressure, the step of intimately mixing an uncured dry urea-formaldehyde resin when in powder form with a curing accelerator consisting of dimethyl-ethyl phosphate in an amount such that the $PO_4$ content is approximately 0.1 per cent to 2.0 per cent of said dry resin, said curing accelerator remaining ineffective at storage temperatures but being capable under the action of molding heat and pressure of accelerating the curing of the molding powder into an infusible mass.

3. In the process of preparing a molding powder which can be molded by heat and pressure, the step of intimately mixing an uncured dry urea-formaldehyde resin when in powder form with a curing accelerator consisting of tri-cresyl phosphate in an amount such that the $PO_4$ content is approximately 0.1 per cent to 2.0 per cent of said dry resin, said curing accelerator remaining ineffective at storage temperatures but being capable under the action of molding heat and pressure of accelerating the curing of the molding powder into an infusible mass.

4. In the process of preparing a molding powder which can be molded by heat and pressure, the step of intimately mixing an uncured dry urea-formaldehyde resin when in powder form with a curing accelerator consisting of a tri-ester of phosphoric acid in an amount such that the $PO_4$ content is approximately 0.1 per cent to 2.0 per cent of said dry resin, said curing accelerator remaining ineffective at storage temperatures but being capable under the action of molding heat and pressure of accelerating the curing of the molding powder into an infusible mass.

5. In the process of preparing a molding powder which can be molded by heat and pressure, the step of intimately mixing an uncured dry urea-formaldehyde resin when in powder form with a curing accelerator consisting of a tri-ester of phosphoric acid in an amount such that the $PO_4$ content is approximately 0.1 per cent to 1.0 per cent of said dry resin, said curing accelerator remaining ineffective at storage temperatures but being capable under the action of molding heat and pressure of accelerating the curing of the molding powder into an infusible mass.

6. In the process of curing urea-formaldehyde resins by heat and pressure, the improvement which comprises accelerating the curing of said resins by intimately mixing with the uncured dry urea-formaldehyde resin when in powdered form a curing accelerator consisting of a tri-ester of phosphoric acid in an amount such that the $PO_4$ content is approximately 0.1 per cent to 2.0 per cent of said dry resin, said curing accelerator remaining ineffective at storage temperatures, then subjecting the powdered mixture to molding heat and pressure thereby developing the action of said accelerator and accelerating the curing of said resin into an infusible mass.

7. A molding powder containing a powdered uncured dry urea-formaldehyde resin in intimate mixture with a curing accelerator consisting of a tri-ester of phosphoric acid in an amount such that the $PO_4$ content is approximately 0.1 per cent to 2.0 per cent of said dry resin, said curing accelerator remaining ineffective at storage temperatures but being capable under the action of molding heat and pressure of accelerating the curing of the molding powder into an infusible mass.

8. In the process of preparing a molding powder which can be molded by heat and pressure, the steps of impregnating paper pulp with an uncured urea-formaldehyde resin syrup, drying and grinding the resin-impregnated pulp to form a dry powder, and when in powder form intimately mixing therewith a curing accelerator consisting of a tri-ester of phosphoric acid in an amount such that the $PO_4$ content is approximately 0.1 per cent to 2.0 per cent of said dry resin, said curing accelerator remaining ineffective at storage temperatures but being capable under the action of molding heat and pressure of accelerating the curing of the molding powder into an infusible mass.

9. A molding powder containing a powdered uncured dry urea-formaldehyde resin in intimate mixture with a curing accelerator consisting of a tri-ester of phosphoric acid in an amount such that the $PO_4$ content is approximately 0.1 per cent to 1.0 per cent of said dry resin, said curing accelerator remaining ineffective at storage temperatures but being capable under the action of molding heat and pressure of accelerating the curing of the molding powder into an infusible mass.

JAMES MARTYN WALTER.